United States Patent
Rule et al.

(10) Patent No.: US 12,335,435 B2
(45) Date of Patent: *Jun. 17, 2025

(54) MACHINE LEARNING DATASET GENERATION USING A NATURAL LANGUAGE PROCESSING TECHNIQUE

(71) Applicant: Capital One Services, LLC, McLean, VA (US)

(72) Inventors: Jeffrey Rule, Chevy Chase, MD (US); Kaitlin Newman, Washington, DC (US); Rajko Ilincic, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 131 days.

This patent is subject to a terminal disclaimer.

(21) Appl. No.: 18/212,429

(22) Filed: Jun. 21, 2023

(65) Prior Publication Data
US 2024/0031477 A1  Jan. 25, 2024

Related U.S. Application Data

(63) Continuation of application No. 17/170,329, filed on Feb. 8, 2021, now Pat. No. 11,711,462, which is a
(Continued)

(51) Int. Cl.
*H04M 3/24* (2006.01)
*G06N 5/04* (2023.01)
(Continued)

(52) U.S. Cl.
CPC ............. *H04M 3/247* (2013.01); *G06N 5/04* (2013.01); *G06N 20/00* (2019.01);
(Continued)

(58) Field of Classification Search
CPC .. H04M 3/247; H04M 3/2218; H04M 3/2281; H04M 3/54; H04M 2203/6027;
(Continued)

(56) References Cited

U.S. PATENT DOCUMENTS 6,771,746 B2   8/2004  Shambaugh et al.
6,832,203 B1  12/2004  Villena et al.
(Continued)

FOREIGN PATENT DOCUMENTS

CN    101266550 A   *  9/2008
CN    103167502 A   *  6/2013
JP    2004112435 A  *  4/2004

*Primary Examiner* — Akelaw Teshale
(74) *Attorney, Agent, or Firm* — HUNTON ANDREWS KURTH LLP

(57) ABSTRACT

A server can receive a plurality of records at a databases such that each record is associated with a phone call and includes at least one request generated based on a transcript of the phone call. The server can generate a training dataset based on the plurality of records. The server can further train a binary classification model using the training dataset. Next, the server can receive a live transcript of a phone call in progress. The server can generate at least one live request based on the live transcript using a natural language processing module of the server. The server can provide the at least one live request to the binary classification model as input to generate a prediction. Lastly, the server can transmit the prediction to an entity receiving the phone call in progress. The prediction can cause a transfer of the call to a chatbot.

21 Claims, 2 Drawing Sheets

Related U.S. Application Data continuation of application No. 16/579,340, filed on Sep. 23, 2019, now Pat. No. 10,958,779.

(51) Int. Cl.

| | |
|---|---|
| *G06N 20/00* | (2019.01) |
| *G10L 15/18* | (2013.01) |
| *G10L 15/22* | (2006.01) |
| *G10L 15/30* | (2013.01) |
| *H04L 9/40* | (2022.01) |
| *H04L 51/02* | (2022.01) |
| *H04M 3/22* | (2006.01) |
| *H04M 3/54* | (2006.01) |

(52) U.S. Cl.
CPC .......... *G10L 15/1815* (2013.01); *G10L 15/22* (2013.01); *G10L 15/30* (2013.01); *H04L 51/02* (2013.01); *H04L 63/1491* (2013.01); *H04M 3/2218* (2013.01); *H04M 3/2281* (2013.01); *H04M 3/54* (2013.01); *G10L 2015/223* (2013.01); *H04M 2203/6027* (2013.01); *H04M 2242/16* (2013.01)

(58) Field of Classification Search
CPC ..... H04M 2242/16; G06N 5/04; G06N 20/00; G10L 15/1815; G10L 15/22; G10L 15/30; G10L 2015/223; H04L 51/02; H04L 63/1491

See application file for complete search history.

(56) References Cited

U.S. PATENT DOCUMENTS

| | | | |
|---|---|---|---|
| 6,856,982 B1* | 2/2005 | Stevens | H04L 63/1416 706/50 |
| 6,879,685 B1 | 4/2005 | Peterson et al. | |
| 6,922,466 B1 | 7/2005 | Peterson et al. | |
| 7,933,387 B1 | 4/2011 | Baker, IV | |
| 7,978,831 B2 | 7/2011 | Baird et al. | |
| 8,190,554 B2* | 5/2012 | Chen | H04M 15/58 707/600 |
| 8,494,133 B2 | 7/2013 | Jeffs et al. | |
| 8,559,618 B1 | 10/2013 | Cordell et al. | |
| 8,625,772 B2 | 1/2014 | Kulkarni | |
| 8,634,542 B2 | 1/2014 | Spottiswoode et al. | |
| 8,731,934 B2 | 5/2014 | Olligschlaeger et al. | |
| 8,756,065 B2 | 6/2014 | Melamed et al. | |
| 8,837,687 B2 | 9/2014 | Odinak et al. | |
| 9,112,974 B1 | 8/2015 | Wilsie et al. | |
| 9,406,075 B1 | 8/2016 | Bansal et al. | |
| 9,571,640 B1* | 2/2017 | Chen | H04M 3/436 |
| 9,692,885 B2 | 6/2017 | Bhupati | |
| 9,774,726 B1* | 9/2017 | Jenkins | H04M 3/2281 |
| 9,854,087 B1* | 12/2017 | Solid | H04L 43/04 |
| 10,666,792 B1* | 5/2020 | Marzuoli | H04M 3/436 |
| 10,791,222 B2* | 9/2020 | Jiron | G10L 17/00 |
| 10,958,779 B1* | 3/2021 | Rule | H04M 3/54 |
| 11,445,065 B1* | 9/2022 | Jiron | H04M 3/5175 |
| 11,790,177 B1* | 10/2023 | Barrasso | H04M 3/2281 704/9 |
| 2005/0259667 A1* | 11/2005 | Vinokurov | H04L 63/1425 379/112.03 |
| 2006/0167654 A1 | 6/2006 | Keinan et al. | |
| 2006/0285665 A1* | 12/2006 | Wasserblat | G06Q 20/4016 704/E17.002 |
| 2007/0071212 A1* | 3/2007 | Quittek | H04L 65/1101 379/210.02 |
| 2008/0063178 A1 | 3/2008 | Paden et al. | |
| 2010/0235223 A1 | 9/2010 | Lyman | |
| 2011/0058660 A1 | 3/2011 | Piratla et al. | |
| 2011/0159855 A1 | 6/2011 | Cheng | |
| 2012/0099716 A1 | 4/2012 | Rae et al. | |
| 2013/0163741 A1 | 6/2013 | Balasaygun et al. | |
| 2015/0381801 A1* | 12/2015 | Rajakumar | H04M 3/2281 379/88.01 |
| 2016/0127536 A1* | 5/2016 | Jayapalan | H04L 65/80 379/265.02 |
| 2016/0247165 A1 | 8/2016 | Ryabchun et al. | |
| 2017/0111515 A1* | 4/2017 | Bandyopadhyay | H04W 12/128 |
| 2017/0134574 A1* | 5/2017 | Winkler | H04L 63/0861 |
| 2017/0374198 A1 | 12/2017 | de Silva et al. | |
| 2018/0020072 A1* | 1/2018 | Masuda | G06F 13/00 |
| 2018/0220000 A1* | 8/2018 | Segalis | G06Q 10/06 |
| 2018/0227416 A1* | 8/2018 | Segalis | G10L 15/222 |
| 2018/0336336 A1* | 11/2018 | Elovici | G06F 21/32 |
| 2019/0037081 A1* | 1/2019 | Rao | H04M 7/0078 |
| 2019/0174000 A1* | 6/2019 | Bharrat | H04M 3/42059 |
| 2019/0394333 A1* | 12/2019 | Jiron | G06F 21/32 |
| 2020/0288011 A1 | 9/2020 | Petty et al. | |

* cited by examiner

MACHINE LEARNING DATASET GENERATION USING A NATURAL LANGUAGE PROCESSING TECHNIQUE

CROSS REFERENCE TO RELATED APPLICATION

This application is a continuation of U.S. patent application Ser. No. 17/170,329 filed Feb. 8, 2021, which is a continuation of U.S. patent application Ser. No. 16/579,340 filed Sep. 23, 2019, now U.S. Pat. No. 10,958,779, the complete disclosures of which are incorporated herein by reference in their entireties.

BACKGROUND

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine-tuning the model parameters using input data.

A chatbot can be a computer program which conducts a conversation with a human user. Many service providers take advantage of chatbots in their technical as well as business operations. For example, some use chatbots for information gathering purposes and others use chatbots for customer service operations.

SUMMARY

With advancements in computer technology, users inevitably share their personal information with many technology platforms. For example, many technology platforms require their customers to provide personal information before these platforms open an account for their customers. Unfortunately, many of these platforms have been targets of security attacks which have compromised the personal information stored with these platforms. As a result, various personal information of customers is available on the web and elicit use of this information has become a common occurrence.

One consequence of the ubiquity of the personal information is that fraudsters can easily access this information and attempt to change account level information for customers. For example, fraudsters often try to call customer service phone lines and change customers' contact information. The goal of these fraudsters is to change a mean of communication by which a one-time code can be transmitted to a customer so that the fraudster can take over the customer's account and ultimately change the password or order a product. Typically, fraudsters try to change mailing addresses, telephone numbers, or email addresses of customers. In fact, over 90% percent of the calls requesting change of email addresses or phone numbers are fraudulent calls.

A system and method is described herein to identify these fraudulent calls and dissuade fraudsters from making future phone calls. In particular, a machine learning technique has been described to identify an incoming phone call and direct the call to a chatbot for stalling the call.

In one example embodiment, a server of a service provider can receive a plurality of records at a databases wherein each record is associated with a phone call and includes at least one request generated based on a transcript of the phone call using a natural language processing module of the server. The server can generate a dataset based on the plurality of records, wherein the dataset shows an association between each phone call and the respective at least one request for the phone call. The server can generate a training dataset, which is a subset of the dataset. The server can further train a binary classification model using the training dataset, wherein the binary classification model is configured to receive an input and generate an output. Next, the server can receive a live transcript of a phone call in progress. The server can generate at least one live request based on the live transcript of the phone call using the natural language processing module of the server. The server can provide the at least one live request to the binary classification model as the input to generate the output. Lastly, the server can transmit the output to an entity receiving the phone call in progress.

The system proposed herein identifies a call as having a high likelihood of being a fraudulent call. Then, the system transfers the call to a chatbot which can keep the caller on the phone for a long period of time. The chatbot can use various information such as the phone number or the caller's responses to ask follow-up questions and waste the caller's time. This technique can prevent fraudsters from calling back in future. The chatbot can provide scripted responses and questions which can verify that the call is indeed fraudulent.

DETAILED DESCRIPTION

Generate a Database Including Call Data

Figure 1:
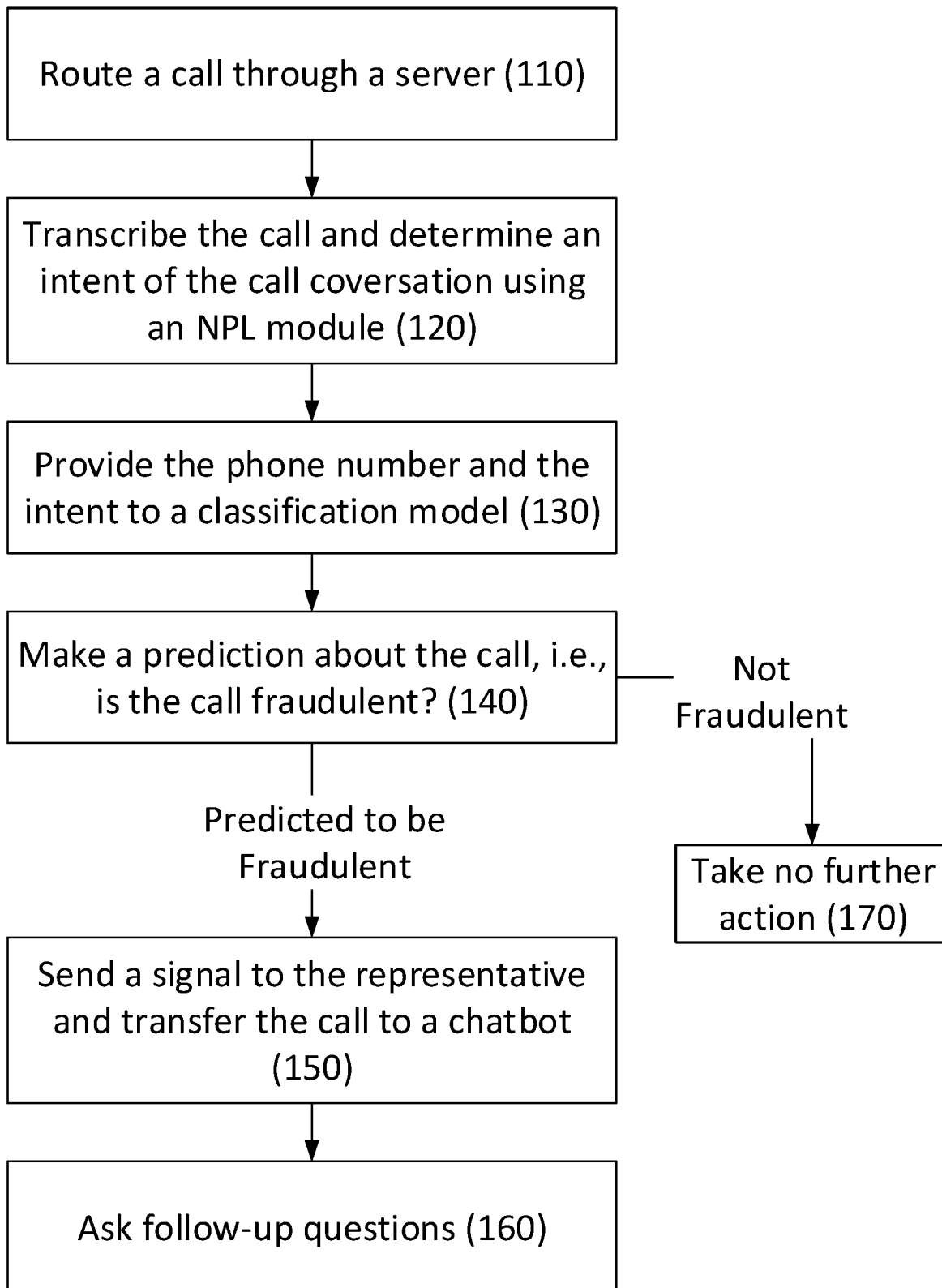
FIG. 1 shows an example flow chart for classification of an incoming call.

In one example embodiment, a service provider can receive a plurality of calls from a plurality of callers. Each caller can discuss at least one request during the call. A server of the service provider can record and analyze the calls as the calls are ongoing. A database of the server can store a record for each call. For example, the record can be a file, folder, media file, document, etc. and include information such as a time for an incoming call, a phone number from which the call was made, a request discussed during the call, an account to which the call pertained, etc. Additionally, the database can store a voice recording for each call. The voice recording can be a part of the record for the respective call. The server can generate a dataset containing information about all or some of the calls received by the service provider. For example, the dataset can include an identification number for each call, a call transcript, a phone number associated with the call, a time of call, one or more requests discussed during the call, and an assessment as to whether the call was fraudulent.

The server can include a transcription module, which can generate a transcript for each call and store the transcript in the database. For example, the transcription module can divide a digital recording into small segments. The transcription module then matches these segments to known phonemes (i.e., the smallest element of a language) in the appropriate language. Next, the transcription module examines phonemes in the context of the other phonemes around them. The transcription module runs the contextual phoneme plot through a complex statistical model and compares them to a large library of known words, phrases and sentences. The transcription module then determines what the caller was saying and outputs it as text. In one embodiment, the transcription module can add the transcript of each call to the dataset.

Oftentimes, fraudsters follow a specific script during a fraudulent call. As such, it is a strong indicator of a fraudulent call if a caller uses a known script previously used by another fraudster. In one example embodiment, the database can store a plurality of scripts previously used by other fraudsters. The server can include a transcript comparison module, which can compare the transcript or parts of the transcript to scripts of other fraudulent calls. The transcript comparison module can calculate a similarity score for the transcript. The similarity score can indicate how similar the transcript is to one or more of the known scripts stored in the database. In one example embodiment, the transcript comparison module can convert the transcript and the scripts to vectors of features. The transcript comparison module can compare the transcript and the scripts by measuring the distance between these features and generate the similarity score based on the comparison. In one example embodiment, for each call represented in the dataset, the transcript comparison module can store the similarity score in association with the respective call.

In one example embodiment, when a caller calls the service provider, a representative of the service provider speaks with the caller and the representative determines one or more requests discussed by the caller during the call. The representative can generate or modify the record for the call to indicate the user's one or more requests. The record can be stored in the database of the server. The server can access the record to update or generate the dataset. For example, in the dataset and in association with the call (or the identification for the call), the server can store an entry indicating the caller's one or more requests.

In one example embodiment, the server can include an intent recognition module, which can analyze the transcript for a call (or a segment of a call) and determine at least one or more requests discussed during the call (or the segment of the call). For example, the intent recognition module can use intent classification techniques. Intent classification can be a natural language understanding ("NLU") task that can understand at a high level what the user's intent is in a conversation, and thus, what request the user is intending to make during the call. The intent recognition module can determine the intent using hard-coded rules with regular expression (i.e., scanning the words). The intent recognition module can also determine the intent by training a supervised machine learning classification model on labeled data. Many machine-learning models can be used for this purpose, e.g., a neural network (or deep learning), a recurrent neural net such as LSTM, decision tree-based methods like random forest or gradient boosted machines, support vector machine, logistic regression, etc. The intent recognition module can also include some preprocessing modules to convert text into character, word, or sentence embeddings that can be fed into the model. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the intent recognition module determines the intent of the call (or the segment of the call), the intent recognition module can determine a request associated with the intent. This can involve named entity recognition ("NER"). NER can be implemented with regular expressions or more complicated statistical models. The intent recognition module can generate or modify the record for the call to indicate the user's one or more requests. The record can be stored in the database of the server. The server can access the record to update or generate the dataset.

In one example embodiment, the intent recognition module can determine that the caller is making a request for an account level change, e.g., a change of address, telephone number, email address or any mean by which the caller can receive a one-time code. The intent recognition module can store this information in the call record and the server can update the dataset to indicate that the caller requested an account level change during the call.

To confuse and stress the representative who answers a call, sometimes fraudsters create a high-stress environment during the call. In some circumstances, the representative is influenced by the high-stress environment and surrenders to the fraudster's demands. For example, some fraudsters play the sound of a baby crying in the background, which can stress many call representatives. In one example embodiment, the server can include a background sound detection module, which can detect background sounds played during the call. The background sound detection module can review a recording of the call and detect the voice of a caller and the voice of the representative answering the call. The background sound detection module can subtract (or take away) the voice of the caller and the voice of the representative answering the call. The background sound detection module can compare what remains after the subtraction (i.e., the background noise) to known background noises stored on the database. For example, the database can store a plurality of known background noises played during known fraudulent calls. Based on the similarity of a background noise during a given call to one or more of the known background noises stored on the database, the background sound detection module can give a similarity score to the background noise detected during the given call. The background sound detection module can update the record for the call to indicate the similarity score and the server can update or generate the dataset based on the updated record for the call.

In one example embodiment, to detect the background noise, the call representative can place the caller on a brief hold. During the hold, only the background noise can be heard or recorded. In this example embodiment, the background sound detection module can detect the background noise without subtracting any sounds from the call recording. The voice recording of the call can include a digital marker which can indicate to the background sound detection module that the call is on hold. The digital marker can be added by the call representative or it can be automatically generated when the caller is placed on hold. In another example embodiment, the call representative can place the caller on a brief hold and play a predetermined music. During the hold, only the background noise and the predetermined music can be heard or recorded. In this example embodiment, the background sound detection module can detect the background noise by subtracting the predetermined music from the call recording.

In one example embodiment, the background sound detection module can identify the background noise. For example, a machine learning algorithm can be trained to detect and determine background noises. In one embodiment, various voice clips including suspected background noises relating to fraudster calls can be filtered and sampled based on sound frequency. For example, the background sound can be processed using a soundwave matching technique. The overall environment consists of multiple overlapping sound waves, e.g., HVAC system hum, computer keyboard clicks, and ambient street noise. These sound waves can be isolated. If a particular combination of unique sound patterns is heard on multiple calls you can assume a call center style environment where multiple fraudsters are calling from. Additionally, these sampled clips can be tagged with a name. The model can be trained with these tagged clips. When a call comes in, the call can be tagged in real-time by providing continues voice samples to the model and get fraud alert scores back. In these embodiments, the background sound detection module can insert a background name in the record for the call and the server can update the dataset accordingly.

In one example embodiment, the database can include a plurality of vocal profiles for prior callers who were identified as fraudsters. Each vocal profile can store the characteristics of the voice of one fraudster, e.g., voice clip samples. The server can include a voice recognition module, which can identify the vocal characteristics of the voice of a caller and create a vocal profile for the caller. The voice recognition module can compare the vocal profile of a caller to the known vocal profiles of fraudsters. Based on the comparison between the vocal profile of the caller and the known vocal profiles for fraudsters, the voice recognition module can give a similarity score. The voice recognition module can store the score in the record for the call and the server can update the dataset accordingly.

In one example embodiment, the server can include an accent recognition module. The accent recognition module can review the voice recording for a call and recognize an accent for the caller. The accent recognition module can store an accent associated with each call in the record for the call. The server can update the dataset to include the accent for each call.

In one example embodiment, each call can be associated with a phone number (or another identification number). The database of the server can store a list of phone numbers associated with fraudsters. A module of the server can compare the phone number against the known phone numbers for fraudsters stored in the database. The server can update the record for the call if there is a match. The server can also update or generate the dataset based on the record for the call.

In one example embodiment, the server can trace the phone number for a call. Phone numbers are available as part of the incoming call data. The server can use the incoming call data.

In one example embodiment, the record for each call can include a time when the call was made and/or the duration of the call. The server can store the time of the call in the dataset for each respective call.

In one example embodiment, for each call included in the dataset or for each call record, the server can store a label indicator, which can indicate whether the call is fraudulent. There can be various techniques for determining whether a call is fraudulent. In one example, if after the call a customer reports fraudulent activity on the account, the server can store a fraud indicator in the dataset or the call record. As another example, after each call, the service provider representative which responds to the call can make a determination about the call. If the representative determines that the call is fraudulent, the representative can leave a label indicator (or a note) in the record for the call. The server can update the dataset to include the label indicator for the call.

In one example embodiment, the dataset can be labeled data for training a machine-learning model to predict whether a call is fraudulent.

Generate a Training Dataset

In some embodiments, the dataset created using the call records (the "main dataset") can be divided into several sub-datasets. For example, the dataset can be divided into a training dataset, a validation dataset and a test dataset. In one example embodiment, 70 percent of the data in the main dataset can be placed in the training dataset, 20 percent of the data can be placed in the validation dataset and 10 percent of the data can be placed in the test dataset. In general, however, no specific ratio for the datasets is required.

In one example embodiment, the training dataset or the main dataset can be a skewed dataset. Although in theory any training dataset can enable a machine learning algorithm to adjust a model for accurate predictions, in practice, some training datasets are inadequate for certain applications. For example, datasets that are imbalanced or include a skewed class distribution are examples of datasets which can be insufficient for training classification models. In these datasets, there usually is a majority class and at least one minority class, and the number of majority class members can significantly exceed those of the minority class members. This phenomenon often occurs in fraud detection, medical diagnosis or spam classification applications. For example, in fraud detection applications, for every fraudulent transaction, there can be hundreds or even thousands of properly authorized transactions.

Machine learning algorithms tend to produce unsatisfactory models when trained with imbalanced training datasets because an imbalanced training dataset does not provide the necessary information about the minority class (or classes). If an imbalanced training dataset is fed into a model, the output will be biased, and in many cases result in always predicting the majority class. In other words, a model trained with an imbalanced dataset tends to be more sensitive to detecting the majority class and less sensitive to the minority class. For example, in the case of the fraud detection model, where most of the transactions are not fraudulent, if the model is trained with imbalanced data, the model might predict every transaction as genuine. Yet in these models, it is very important to discover the rarely occurring minority class members. Failure to discover these members can be costly and undermine the model's accuracy and usefulness. For example, failure to detect a fraudulent transaction or phone call can cost the financial institution money and other valuable resources.

There are various sampling techniques for balancing an imbalanced training dataset (or dataset). Oversampling, undersampling or a combination of the two are only a few examples of such sampling techniques. These techniques can be used to change the class distribution of a training dataset or to correct a bias in the training dataset. Oversampling will multiply the minority class members in the training dataset so that the training dataset is balanced (or oversampling will multiply selection of the minority class members so that a balanced sample dataset is collected). Undersampling, on the other hand, will discard the majority class members in the training dataset so that the training dataset is balanced (or undersampling will decrease selection of the majority class members so that a balanced sample dataset is collected).

Additionally, hybrid sampling techniques which combine oversampling and undersampling, Random Under-Sampling, Random Over-Sampling, Cluster-Based Over Sampling, Synthetic Minority Over-sampling Technique and Modified synthetic minority oversampling technique are a few examples of sampling techniques which can balance a skewed dataset.

The Classification Model

In some embodiments, multiple datasets are used at different stages of creating classification models. These datasets can include a training dataset, a validation dataset and a test dataset. Initially, the training dataset can be used to fit the parameters of the model. The training dataset can include an input vector (e.g., the identification number for each call) and the corresponding answer vector (or the target or label). In this stage, the training dataset is fed to the model and the model produces a result set, which can be compared with the target. Based on this comparison, the parameters of the model can be adjusted. After adjusting the parameters of the model, a validation dataset can be fed into the model to further refine the parameters of the model. The validation dataset provides an unbiased evaluation of the model fit on the training dataset while tuning the model's hyperparameters. Finally, the test dataset can be used to provide an unbiased evaluation of a final model fit on the training dataset. Yet in other embodiments, there is no need for training a model using the datasets as described above because fewer or more datasets can be used to train the model.

In one example embodiment, the main dataset can be used to train a classification model as describe above. Once the classification model is trained, during a call, the server can provide certain data points as input to the classification model and receive an output from the classification model. Based on the output, the server can transfer the call to a chatbot.

For example, at the beginning of a call, the server is configured to gather certain data points about the call, e.g., the server can receive or ascertain information about a time for an incoming call, a phone number from which the call was made, etc. Additionally, the server can record a segment of the call, and based on the recording, the server can generate data points such as a transcript for the segment of the call, a request discussed during the call, an account to which the call pertained, a background noise, an indication of whether the segment of the call is similar to a known script for fraudulent calls, a vocal profile for the caller, an indication of whether the voice of the caller is a known vocal profile, an accent of the caller, etc. The server can provide these data points as input to the classification model and the classification model can provide an output which would indicate whether the call is a fraudulent call. For example, the classification model can assign a percentage rate to the call, and the percentage rate can indicate the likelihood that the call is a fraudulent call.

If the assigned percentage rate is higher than a predetermined rate, the server can escalate the call. When a call is escalated, the service provider can refuse to honor the caller's request. For example, the server can transmit a communication to the representative who is answering the call and ask the representative to transfer the call to the chatbot or place the call on hold so that the server can transfer the call to the chatbot. As another example, an escalated call can be transferred to an endless Interactive Voice Response phone loop.

The Chatbot

A chatbot (also known as a smartbot, talkbot, chatterbot, Bot, IM bot, interactive agent, Conversational interface or Artificial Conversational Entity) can be a computer program or an artificial intelligence which conducts a conversation via auditory or textual methods. A chatbot can provide a conversational experience for interaction with users. In one example, a user can ask a question, the chatbot can interpret the question and then provide an answer. In another example, a chatbot can ask a question or ask a user to provide certain information to the chatbot. The user can provide a response to the chatbot which can classify the information in the response, and act according to the information. A chatbot can be used in a dialog system for various purposes, e.g., customer service or information acquisition.

In an example embodiment, the server can include a chatbot. A call can be transferred to the chatbot to continue the conversation with the caller. The chatbot can use natural language processing systems or techniques. For example, the chatbot can use intent classification techniques to understand what the user asks the chatbot. The server can also include some preprocessing modules to convert text into character, word, or sentence embeddings that can be fed into the chatbot. Basic preprocessing can include stemming or lemmatization, sentence or word tokenization, stopword removal, etc. This can include a term frequency based approach, including TF-IDF, or Word2Vec, Universal Sentence Encoder, etc. Part of the NLU can also include dependency parsing to try to capture negation, or sentiment analysis.

Once the chatbot knows the intent of the conversation (e.g., account update when the caller asks the chatbot to change the address associated with an account), the chatbot can perform a task associated with the intent. This can involve named entity recognition ("NER") to extract the specific information that the chatbot needs to fulfill the request. If the chatbot does not find the information it needs, the chatbot can ask further questions to get the required information. NER can be implemented with regular expressions or more complicated statistical models.

In another example embodiment, a chatbot can scan for keywords within a request or message. The chatbot can associate a task with certain keywords included in the request. For example, if there is a "Hello" keyword in the request, the chatbot can associate this keyword with the task of greeting. The chatbot can reply to the request based on the task associated with the keyword. For example, the chatbot can reply a greeting phrase in response to receiving a greeting task.

In one example embodiment, after a call is transferred to the chatbot, the chatbot is configured to waste the caller's time without achieving any particular purpose. The idea is that if the service provider wastes the fraudster's time, the fraudster is less unlikely to call the service provider again to perpetrate a fraud because the service provider not only does not engage with the fraudster, the service provider also wastes the fraudster's time. For example, when a caller is a suspected fraudster, the call can be transferred to a chatbot. The chatbot can ask the caller a few introductory questions and solicit answers. The chatbot can determine the questions based on a variety of factors. For example, the chatbot can receive some of the information that was provided to the classification model as input. Using this information, the chatbot can ask follow-up questions. As another example, the chatbot can ask a set of predetermined questions and solicit answers. As yet another example, the chatbot can ask a mix of predetermined questions as well as follow-up questions. For example, the chatbot can start by asking the user what the user's reason is for calling the service provider. Based on the user's answer, the chatbot can ask a question defined in a decision tree for the user's request. The chatbot can also ask random questions.

In one example embodiment, the chatbot can include a strategy module for responding to a transferred call. The strategy module can select between one or more of the following strategies when the chatbot is engaging a caller. In one example, according to a first strategy, the chatbot can ask questions and based on the caller's answers the chatbot can ask follow-up questions. In another example, according to a second strategy, the chatbot can place the caller on hold. In yet another example, according to a third strategy, the chatbot can transfer the caller to another chatbot. The chatbot can mix the above strategies to generate new strategies. For example, a chatbot can ask a few introductory questions from a caller and place the caller on hold after asking the questions. Subsequently, the chatbot can ask follow-up questions based on the caller's answers, the chatbot can transfer the call to another chatbot. The second chatbot can ask the same or different questions and follow a different strategy when engaging the caller.

The chatbot can determine the strategy for engaging the caller based on a variety of factors. For example, for a caller that is not a first time caller, the chatbot can implement a different strategy than the strategy that was implemented the first time. Specifically, using the voice recognition module or based on the phone number associated with the caller, the server can determine that the caller is not calling the service provider for the first time. When the call is transferred to the chatbot, the server can send an indication to the chatbot that the call is not a first time call. The strategy module can review the strategy implemented for the caller the first time. Using the indication as well as the strategy that was implanted the first time, the strategy module can devise a new strategy for engaging the caller. As another example, the chatbot can devise a random strategy for each caller. As yet another example, the chatbot can select a strategy based on a response provided by the caller. For example, in response to an introductory question, the caller can speak a sentence. The chatbot can record the sentence and provide it to an accent recognition module to identify the accent of the caller. Based on the accent of the caller, the chatbot can devise a strategy for engaging the caller.

Example Embodiment

FIG. 1 shows an example flow chart for classification of an incoming call. In one example embodiment, in step 110, a call can be routed through a server to a customer service line of a service provider. The server can listen to the call and record the call. The caller can ask the representative of the service provider to change an email address associated with an account of the caller. In step 120, a transcriber module of the server can transcribe the call and a natural language processing module of the server can determine a request discussed during the call, i.e., change of the email address associated with the account. In step 130, the server can provide the request as well as the phone number from which the call is made to a classification module. In step 140, the classification model can make a prediction about whether the call is a fraudulent call. If the call is not predicted to be a fraudulent call, the system will take no further action. If the call is predicted to be a fraudulent call, in step 150, the server can send a signal to the representative and transfer the call to a chatbot. In step 160, the chatbot can ask questions and receive input from the caller.

In one example embodiment, instead of transferring the call to the chatbot, the server can transmit a message to the representative. In one example, the message can include a false second factor authentication. In another example, the message can ask the representative to issue the false second factor authentication. In yet another example, the message can ask the representative to pretend to change the email address or phone number but not actually do it.

In one example embodiment, in step 150, instead of transferring the call to a chatbot, the call can be transferred to an endless Interactive Voice Response (IVR) phone loop. In an endless IVR phone loop, the fraudster is continuously prompted with questions and the fraudster is asked to press a key in response to these questions. For example, the user is asked to press 1 for a change of email address and press 2 for a change of telephone number. The fraudster will be presented with many questions and in response to these questions, the fraudster will have to press various keys. An endless IVR phone loop will present random questions to the fraudster and ultimately wastes the fraudster's time because it will not allow the fraudster to achieve his or her goal.

In one example embodiment, the questions presented to the fraudster in an endless IVR phone loop are predetermined. For example, all fraudsters will receive the same set of questions. In another example embodiment, the questions can be shuffled, i.e., selected at random. In yet another example, the questions are presented in a decision tree, i.e., the subsequent questions will depend on the fraudster's response to previous questions.

Technical Implementation of the Server

Figure 2:
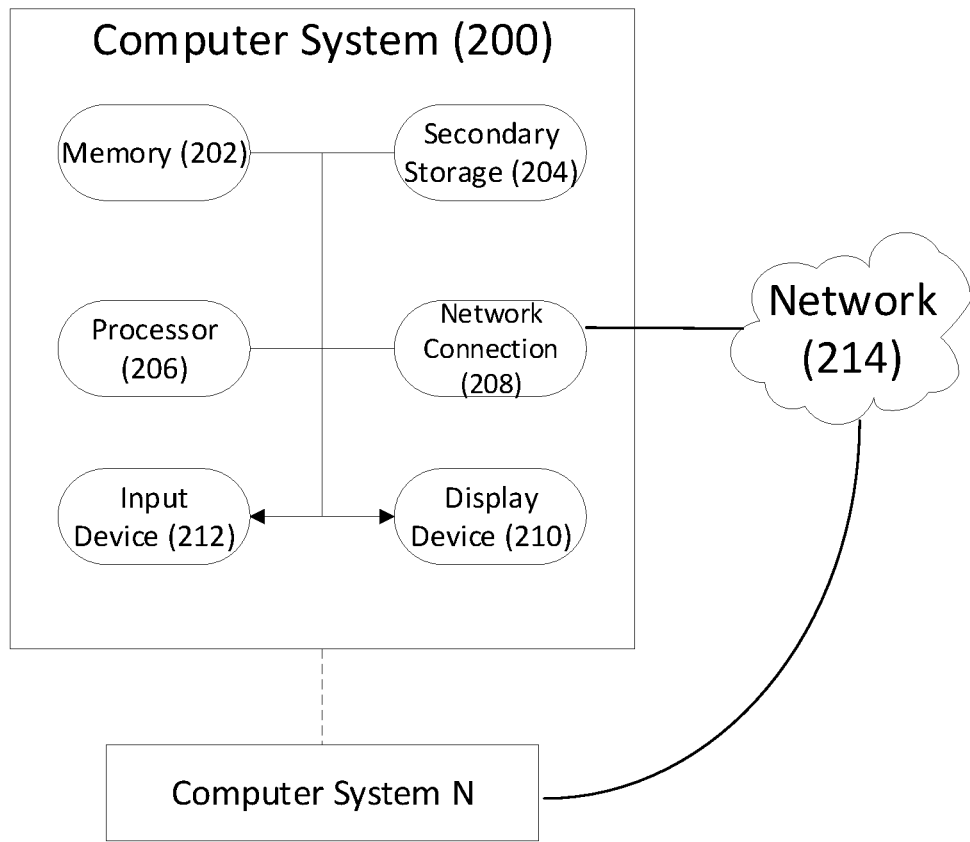
FIG. 2 illustrates exemplary hardware components for a server.

FIG. 2 illustrates exemplary hardware components of a server. A computer system 200, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 200, may run an application (or software) and perform the steps and functionalities described above. Computer system 200 may connect to a network 214, e.g., Internet, or other network, to receive inquiries, obtain data, and transmit information and incentives as described above.

The computer system 200 typically includes a memory 202, a secondary storage device 204, and a processor 206. The computer system 200 may also include a plurality of processors 206 and be configured as a plurality of, e.g., bladed servers, or other known server configurations. The computer system 200 may also include a network connection device 208, a display device 210, and an input device 212.

The memory 202 may include RAM or similar types of memory, and it may store one or more applications for execution by processor 206. Secondary storage device 204 may include a hard disk drive, floppy disk drive, CD-ROM drive, or other types of non-volatile data storage. Processor 206 executes the application(s), such as those described herein, which are stored in memory 202 or secondary storage 204, or received from the Internet or other network 214. The processing by processor 206 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 200 may store one or more database structures in the secondary storage 204, for example, for storing and maintaining the information necessary to perform the above-described functions. Alternatively, such information may be in storage devices separate from these components.

Also, as noted, processor 206 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 200.

The input device 212 may include any device for entering information into the computer system 200, such as a touchscreen, keyboard, mouse, cursor-control device, microphone, digital camera, video recorder or camcorder. The input and output device 212 may be used to enter information into GUIs during performance of the methods described above. The display device 210 may include any type of device for presenting visual information such as, for example, a computer monitor or flat-screen display (or mobile device screen). The display device 210 may display the GUIs and/or output from sub-system components (or software).

Examples of the computer system 200 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 200 is shown in detail, system 200 may use multiple computer systems or servers as necessary or desired to support the users and may also use back-up or redundant servers to prevent network downtime in the event of a failure of a particular server. In addition, although computer system 200 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 200, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method, comprising:
receiving, at a server, a plurality of records, wherein each record includes a call recording, a phone number, and a fraud designation being one of fraudulent or non-fraudulent;
creating, using a processor, a training dataset including a plurality of data points, each data point including the call recording, the phone number, and the fraud designation;
training, using the processor, a classification model using the training dataset;
receiving, at the server, a new phone call from a new phone number;
labeling, using the processor, the new phone call with a new fraud designation based on a classification by the classification model, wherein the new fraud designation is fraudulent or non-fraudulent; and
transmitting, using the processor, a transfer signal to a device to transfer the new phone call when the new fraud designation is fraudulent.

2. The method of claim 1, wherein the transfer signal is configured to cause a transfer of the new phone call to a chatbot.

3. The method of claim 2, wherein the chatbot is configured to receive a verbal query from a caller and provide a response to the caller based on the verbal query.

4. The method of claim 3, wherein the response is a verbal response, a delay in response or a placement of the new phone call on hold.

5. The method of claim 1, wherein the transfer signal is configured to cause a transfer of the new phone call to an Interactive Voice Response (IVR) phone loop.

6. The method of claim 1, wherein each record includes an account number or a time of the new phone call.

7. The method of claim 1 further comprising detecting a background noise for each record.

8. The method of claim 7 further comprising adding the background noise for each record to a data point for the record.

9. The method of claim 1 further comprising detecting a voice profile for a caller for each record.

10. The method of claim 9 further comprising adding the voice profile for each record to a data point for the record.

11. The method of claim 1 further comprising determining, using a natural language processing module, an intent of the call recording.

12. The method of claim 11 wherein the intent is determined based on keywords used in a conversation in the call recording.

13. The method of claim 11 wherein the intent is determined using a machine learning model.

14. The method of claim 13 further comprising using an intent recognition module that includes preprocessing modules to convert text into character, word, or sentence embeddings that is fed into the machine learning model.

15. The method of claim 1 further comprising generating a new call recording or detecting a new background noise for the new phone call.

16. The method of claim 15 further comprising labeling the new phone call using the new call recording or the new background noise.

17. The method of claim 15 further comprising comparing the new background noise to a plurality of known background noises.

18. The method of claim 17 further comprising providing the new phone number to the classification model if the new background noise matches a known background noise.

19. The method of claim 1, wherein the training dataset is generated by sampling a dataset using a sampling technique.

20. The method of claim 19, wherein the sampling technique is undersampling the dataset or oversampling the dataset.

21. The method of claim 19, wherein the sampling technique is a Synthetic Minority Over-sampling Technique, a Modified synthetic minority oversampling technique, a Random Under-Sampling, or a Random Over-Sampling.

* * * * *